United States Patent [19]

Moriwake

[11] Patent Number: 5,166,796
[45] Date of Patent: Nov. 24, 1992

[54] SPECIAL EFFECT APPARATUS

[75] Inventor: Katsuakira Moriwake, Kanagawa, Japan

[73] Assignee: Sony Corporation, Tokyo, Japan

[21] Appl. No.: 796,377

[22] Filed: Nov. 22, 1991

[30] Foreign Application Priority Data

Nov. 30, 1990 [JP] Japan .................. 2-329626

[51] Int. Cl.⁵ .............. H04N 5/262; H04N 5/272
[52] U.S. Cl. ......................... 358/183; 358/22; 358/166; 358/162
[58] Field of Search .......... 358/22, 21 R, 167, 37, 358/162, 160, 183, 166; 340/729, 730

[56] References Cited

U.S. PATENT DOCUMENTS

| | | | |
|---|---|---|---|
| 4,392,156 | 7/1983 | Duca et al. | 358/183 |
| 4,827,344 | 5/1989 | Astle et al. | 358/183 |
| 4,839,725 | 6/1989 | Ueda | 358/162 |
| 4,918,528 | 4/1990 | Oohashi | 358/37 |

FOREIGN PATENT DOCUMENTS 0169284 9/1984 Japan ...................... 358/167
0049378 3/1991 Japan .

Primary Examiner—Jeffery A. Brier
Assistant Examiner—Minsun Oh
Attorney, Agent, or Firm—Alvin Sinderbrand; William S. Frommer

[57] ABSTRACT

A special effect apparatus temporally enlarges an input video signal so as to reduce edge intrusion caused by a type of special effect processing and to eliminate color fading due to different sampling frequencies for the luminance and chrominance components of a video signal. The temporally enlarged video signal is formed by sequential selection among three signals: a reference video signal, a preceding video signal which temporally leads the reference video signal and a trailing video signal which temporally lags the reference video signal. Portions of the preceding and trailing video signals are appended to the reference video signal to produce the temporally enlarged video signal which can be processed to create a special effect devoid of edge intrusion.

4 Claims, 4 Drawing Sheets

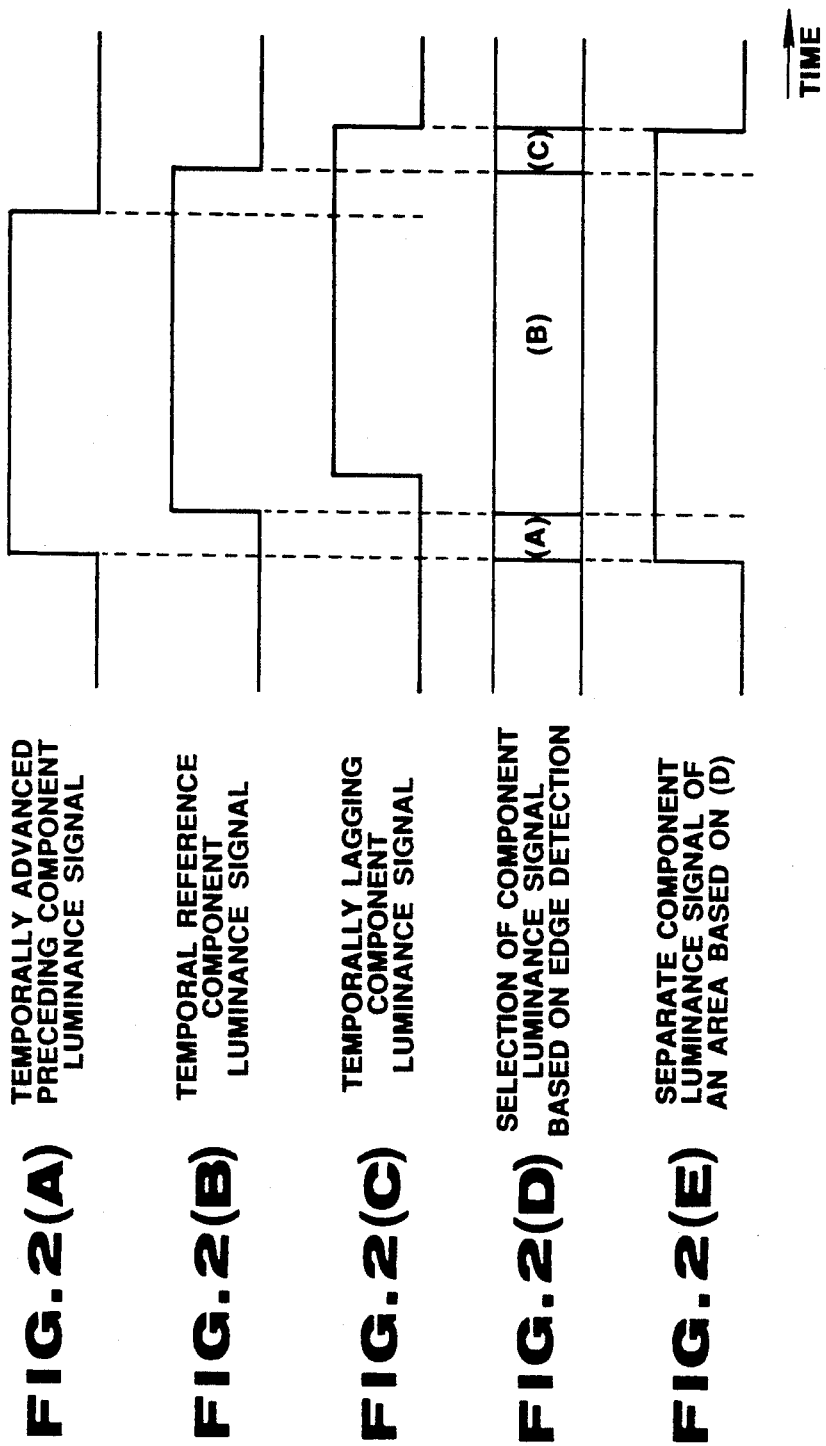

COLOR NOT FADING

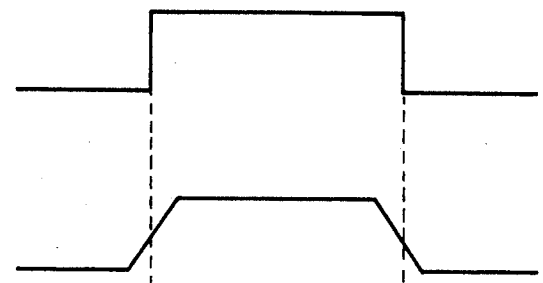
FIG. 5(A) INPUT VIDEO SIGNALS
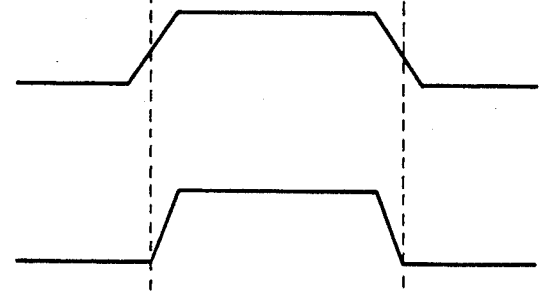
FIG. 5(B) INPUT KEY SIGNALS
FIG. 5(C) ADJUSTED KEY SIGNAL
FIG. 5(D) SYNTHESIZED VIDEO SIGNAL OUTPUT
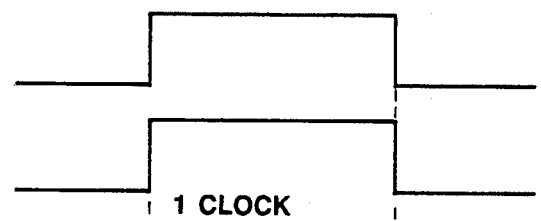
FIG. 6(A) { LUMINANCE SIGNAL Y / CHROMINANCE SIGNAL CR, CB
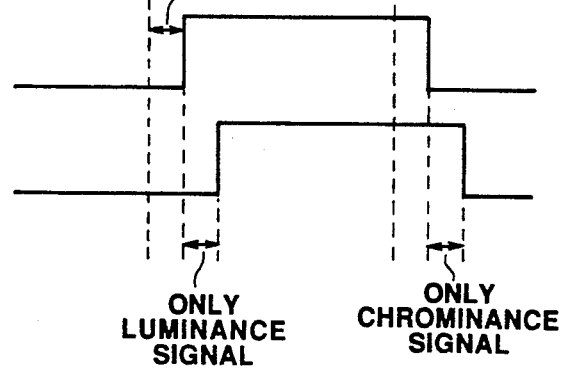
FIG. 6(B) { LUMINANCE SIGNAL Y / CHROMINANCE SIGNAL CR, CB
ONLY LUMINANCE SIGNAL     ONLY CHROMINANCE SIGNAL

SPECIAL EFFECT APPARATUS

BACKGROUND OF THE INVENTION

1. Field of the Invention

This invention relates to a special effect apparatus and, more particularly, to a special effect apparatus for improving the picture quality of edges when performing a picture converting operation.

2. Description of Related Art

Recently, pictures prepared by exploiting special effect artifices, such as by wrapping a signal-processed video image around a curved surface and synthesizing the image with the background, or by, as it were, affixing an image on a paper sheet and bending the image in the manner of folding a page of a book, have come to be used in increasing numbers in broadcast TV programs.

When the background image is simply synthesized with the signal-processed image (image corresponding to the foreground) to form an image, the synthesized image is displayed by switching in accordance with key signals inputting the two images. These key signals are generated in accordance with input video signals. Therefore, if a boundary line or an interface between the two images abruptly changes the input key signals are also abruptly changed, that is, switched acutely. Since high frequency components are contained in the key signals causing the acute switching, the interface between the two images synthesized in accordance with the key signals is necessarily disturbed.

When a video signal as shown in FIG. 5(A) is entered, a key signal is formed, which key signal has a rising edge and a falling edge temporally surrounding the rise and decay timing of the input video signal, as shown in FIG. 5(B), in order to prevent the key signal level from being changed acutely at the rise and decay timings of the input video signal for smoothing the disturbances in the edge boundary region brought about by simple signal synthesis. By raising the gain of the key signal to clip its lower level, an adjusted key signal shown in FIG. 5(C) is produced. By multiplying the key signal shown in FIG. 5(C) by the input video signal shown in FIG. 5(A), a synthesized image having a smooth edge boundary between the component images, as shown in FIG. 5(D), is produced.

However, in the synthesized output video signal, shown in FIG. 5(D), a visual nipping or intruding effect is produced in the boundary line between the surrounding background image and the signal-processed image.

It is noted that a mean value between the signal level of an area corresponding to the surrounding background image and the signal level of an area of the signal-processed image represents a boundary line of the synthesized image. Since the synthesized image is obtained as a function of the key signal adjusted as shown in FIG. 5(C), the level of the mean value between the maximum and minimum values of the adjusted key signal represents the boundary line of the component images of the synthesized image. Since the boundary line displayed at the input video signal start position is synthesized by the adjusted key signal, the edge is seen to be pushed or intruded towards the inside of the video signal curve by a level difference between the level of the input video signal start position and the level of the boundary position of the adjusted key signal, that is a level difference d shown in FIG. 5(D), resulting in a correspondingly reduced size of an image combined from the foreground and the background.

In this manner, for effecting a smooth display, the boundary line between the background and the video signal synthesized thereto has a small width, when viewed as a picture, and looks as if the center of the width of the boundary line were shrinking towards the inside region of the video signal.

On the other hand, if the background and the component digital signals are combined using the luminance signals and chrominance signals having a different bandwidth from the luminance signals as input video signals so as to be based on the Db 1 format used in a so-called 4:2:2 component digital video tape recorder, there are produced, by the above described conventional special effect apparatus, portions in which only luminance signals exist, that is, portions devoid of color.

TABLE 1

|  | sample number | | | | | | |
| --- | --- | --- | --- | --- | --- | --- | --- |
|  | 0 | 1 | 2 | 3 | 4 | 5 | 6 |
|  | E | O | E | O | E | O | E |
| luminance signal (Y) | * | * | * | * | * | * | * |
| Chrominance signal ($C_R$) | * |  | * |  | * |  | * |
| Chrominance signal ($C_B$) | * |  | * |  | * |  | * |

E: even-numbered sample
O: odd-numbered sample
*: indicated that the signal is processed by sampling The above described phenomenon is brought about by the manner of sampling according to the above mentioned D1 format. Referring to Table 1, the luminance signal Y as one of the component signals is sampled at a frequency of 13.5 MHz, whilst the chrominance signals ($C_R$ and $C_B$) as the other component signals are sampled at a frequency of 6.75 MHz which is half the sampling frequency of the luminance signals, for example, at even numbers (0, 2, 4, 6, . . . ) of the sampling numbers (0, 1, 2, 3, . . . ) of the luminance signals.

If the luminance signal (Y) and the chrominance signals ($C_R$, $C_B$) are sampled at the timings of the same even sampling numbers, there is no portion devoid of color in the synthesized picture. However, in case of odd numbered sampling with a shift of one clock period with respect to the even numbered sampling, chrominance signal sampling is not made, so that only the luminance signal is displayed for the odd-numbered sampling. That is, portions devoid of color are produced in the image. Furthermore, due to sampling deviation of the chrominance signals, chrominance signals are displayed in those portions which are devoid of luminance signals.

OBJECTS AND SUMMARY OF THE INVENTION

In view of the above described state of the art, it is an object of the present invention to provide a special effect apparatus wherein the boundary edge portion of the synthesized image is not intruded towards an inner region of the input video signal. It is another object of the present invention to provide a special effect apparatus wherein, even when input signals are component signals of the so-called D1 format, there is no risk that only the luminance signals are displayed without color or only chrominance signal components are displayed in portions devoid of the luminance signals.

In accordance with the present invention, there is provided a special effect apparatus comprising: means for receiving an input video signal, means for receiving a key signal, a signal delaying circuit for delaying the input video signal so as to produce reference video signal, a preceding video signal temporally leading said reference video signal and a trailing video signal temporally lagging said reference video signal, and changeover switch means responsive to the key signal for sequentially selecting a portion of the preceding video signal which temporally leads the reference video signal, followed by the entirety of the reference video signal, and concluding with a portion of the trailing video signal which temporally lags the reference video signal so as to produce a temporally enlarged video signal.

It is possible with the special effect apparatus of the present invention to enhance a picture component area of luminance signals to be synthesized with background signals.

BRIEF DESCRIPTION OF THE DRAWINGS

FIGS. 2(A)-2(E) are signal waveform diagrams for illustrating the operating principle of the apparatus shown in the block circuit of FIG. 1.

FIGS. 5(A)-5(D) are waveform diagrams showing the manner in which edge invasion occurs at the boundary with a conventional apparatus.

FIGS. 6(A)-6(B) are signal waveform diagrams showing the manner in which color failure occurs at the boundary with a conventional apparatus.

DESCRIPTION OF PREFERRED EMBODIMENTS

Figure 1:
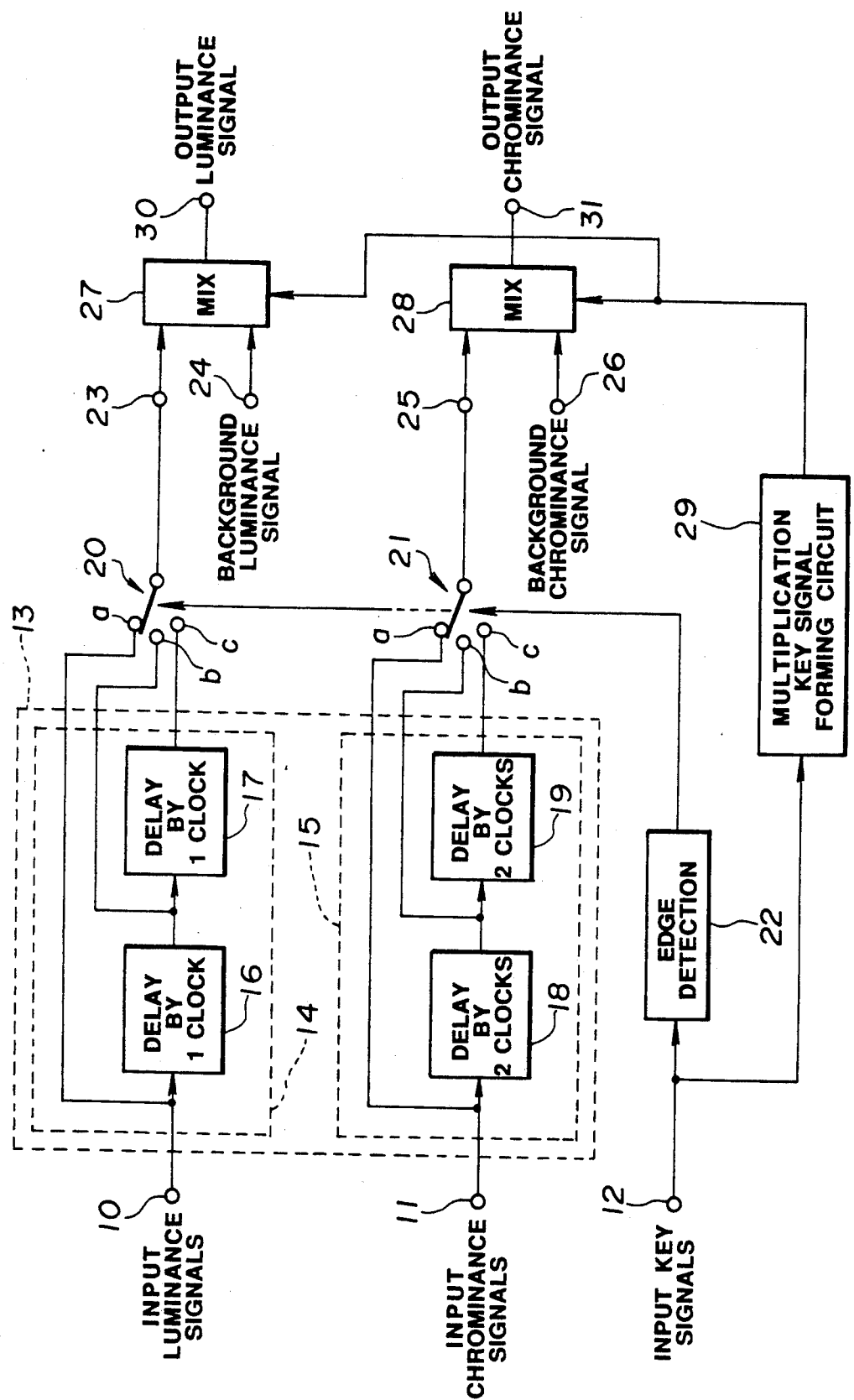
FIG. 1 is a block circuit diagram showing an embodiment of a special effect apparatus according to the present invention.

Referring to the drawings, illustrative embodiments of the present invention will be explained in detail.

FIG. 1 is a block diagram showing an embodiment of a special effect apparatus according to the present invention.

In the block diagram of FIG. 1, a luminance signal Y, one of component signals of the so-called D1 format, is entered at an input terminal 10, and a chrominance signal, which is another component signal, is entered at the input terminal 11. It is noted that the chrominance signal entered at the input terminal 11 is a simplified representation of two color difference signals ($C_R$, $C_B$).

Meanwhile, if the input video signal is a decoded video signal, the chrominance signal naturally is superfluous.

An input key signal, formed for picture switching on the basis of input video signals, is also entered at an input terminal 12.

A delay circuit section 13 processes the input video signal so as to produce a reference video signal, a preceding video signal temporally leading the reference video signal and a trailing video signal temporally lagging the reference video signal, is constituted by a delay circuit section for luminance signals 14 and a delay circuit section for chrominance signals 15.

The delay circuit section for luminance signals 14 includes a delay device 16 for delaying the luminance signals by one clock period determined by the sampling frequency 13.5 MHz of the luminance signal and a second delay device 17 for delaying the output from the delay device 16 further by one clock period.

The delay circuit section for chrominance signals 15 also includes a delay device 18 for delaying the chrominance signal by one clock period determined by the sampling frequency of 6.75 MHz of the chrominance signal and a second delay device 19 for delaying the output of the delay device 18 further by one clock period. For delaying the chrominance signals, a delay device for delaying the chrominance signals by two clocks in terms of the delay quantity of the delay device for luminance signals in accordance with the so-called D1 format, is employed.

The aforementioned preceding component video signals temporally leading the reference video signals, the reference video signals and the trailing component video signals temporally lagging the reference video signals, are respectively supplied to three terminals a to c of changeover switches 10 and 21 adapted for selecting the component signals outputted with or without delay from the delay circuit section 13.

The output signals from the changeover switches 20, 21 are temporally enlarged component video signals produced by the changeover switches in response to an edge detection signal, which is produced by an edge detection circuit 22 adapted for detecting the edge of the input luminance signal in accordance with the input key signal supplied at the input terminal 12. The changeover switches sequentially select the portion of the preceding component video signal which temporally leads the reference component video signal, followed by the entirety of the reference component video signal, and concluding with the portion of the trailing component video signal which temporally lags the reference component video signal.

The temporally enlarged luminance signals are supplied to an input terminal 23 for component luminance signals of a mixer 27 for summation with background luminance signals.

The background luminance signals are entered via input terminal 24 with the mixer 27 for summation to the luminance signals.

On the other hand, the temporally enlarged chrominance signals are supplied to an input terminal 25 for component chrominance signals of a mixer 28 for summation with background chrominance signals. The background chrominance signals are entered via input terminals 26 to the mixer 28 for summation with the chrominance signals.

A key signal for multiplication is supplied to the mixers 27, 28 by means of a multiplication key signal forming circuit 29 which is a circuit for forming a key signal for setting a timing for multiplication.

The component luminance signal, synthesized with the timing of the multiplication key signal, is supplied to an output terminal 30 of the mixer 27 adapted for summing or synthesizing the temporally enlarged component luminance signal and the background luminance signal. Similarly, the component chrominance signal, synthesized with the timing of the multiplication key signal, is supplied to an output terminal 31 of the mixer 28 adapted for summing or synthesizing the temporally enlarged component chrominance signal and the background chrominance signal.

In this manner, the special effect apparatus of the present invention outputs component luminance signals and component chrominance signals synthesized from the respective background picture and input foreground pictures.

The operating principle of the block circuit configuration shown in FIG. 1 is explained by referring to the signal waveform diagrams shown in FIGS. 2(A)-2(E).

It is noted that only the component luminance signals in FIG. 1 are shown in the signal waveform diagrams of FIGS. 2(A)-2(E).

The waveform signal shown in FIG. 2(A) represents the preceding component luminance signal temporally leading the reference component luminance signal supplied to the terminal a of the changeover switch 20.

The waveform signal shown in FIG. 2(B) represents the reference component luminance signal supplied to the terminal b of the changeover switch 20.

The waveform signal shown in FIG. 2(C) represents the trailing component luminance signal temporally lagging the reference component luminance signal to the terminal c of the changeover switch 20.

FIG. 2(D) shows areas A, B and C allocated for the temporally preceding signal portion, reference signal and temporally trailing signal portion, respectively.

Such allocation becomes possible by the fact that the respective component luminance signals have been selected on the basis of the edge detection.

The waveform signals shown in FIG. 2(E) indicate the waveform of the temporally enlarged component luminance signal consisting of the areas sequentially selected on the basis of the edge detection shown in FIG. 2(D).

It is seen from FIG. 2(E) that the picture regions for the component luminance and chrominance signals have been enlarged with the present special effect apparatus.

The manner in which the edge invasion phenomenon in a display image formed by ordinary input video signals may be reduced is hereinafter explained by using the waveform signals shown in FIGS. 3(A)-3(D).

It is noted that, with the present special effect apparatus, the phenomenon of edge invasion of the input video signals may be reduced by simply inputting input video signals, such as monochromatic video signals or digital or analog composite video signals of the D2 format to one signal line of the block circuit diagram of FIG. 1.

In the present case, input video signals are inputted to the signal line of the luminance signals shown in FIG. 1.

Figure 3A:
FIGS. 3(A)-3(D) are waveform diagrams for illustrating the manner in which the edge invasion occurring at the boundary may be reduced.

The signal waveform shown in FIG. 3(A) represents that of the input video signals.

Figure 3B:
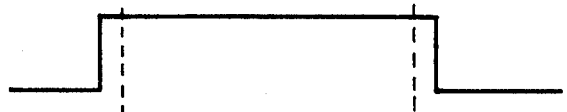

The signal waveform shown in FIG. 3(B) represents the input video signal enlarged in temporal width by being supplied by means of the changeover switch 20 which sequentially selects among the signals produced by the delay circuit section 13 in response to the signal from the edge detection circuit 22 of the circuit shown in FIG. 1.

Figure 3C:

The signal waveform shown in FIG. 3(C) represents the key signal adjusted so that its rising and falling edges begin and end at the corresponding edges of the temporally enlarged video signal.

Figure 3D:
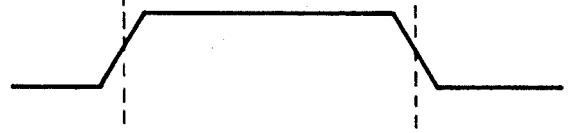

The mixer 27 synthesizes temporally enlarged video signal supplied via input terminal 23 and the background video signal entered via input terminal 24 based on the adjusted key signal shown in FIG. 3(C). The resultant video signal is as shown in FIG. 3(D). In the mixer 27, a key signal is given as the inverted level of the adjusted key signal and the output signal is formed on the basis of the key signal. An image having a specific effect is produced by mixing the temporally enlarged and background signals. The mixer 27 is capable of performing a signal processing of cross-fading in connection with the background.

By providing the temporally enlarged key signal with a tilt and synthesizing it in an analog fashion with the background signal, the boundary line of the surrounding background and the boundary line of the input image may be brought into coincidence in mean level value with the background and the input video (foreground) signals to inhibit the edge intrusion effect.

Meanwhile, the problem of color failure has occurred when the digital signals of the so-called D1 format are entered. The manner in which the input image area of both the luminance component signals and the chrominance component signals can be temporally enlarged by the operating principle explained with reference to FIGS. 2(A)-2(E) and the manner in which the input luminance signals are displayed, are hereinafter explained with reference to the signal waveforms shown in FIGS. 4(A)-4(D).

Figure 4A:
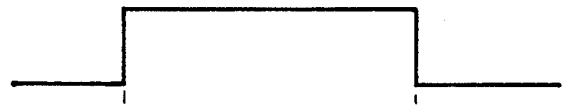
FIGS. 4(A)-4(D) are waveform diagrams for illustrating the manner in which color failure occurring at the boundary may be eliminated.

FIG. 4(A) shows an input component reference luminance signal Y. The sample at the rising edge of the signal is an even-numbered sample.

Figure 4B:
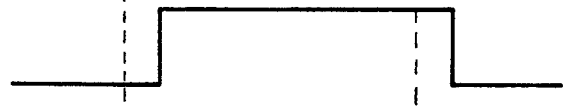

The signal waveform in FIG. 4(B) shows input component chrominance signals $C_R$ and $C_B$. This waveform shows the case in which odd-numbered samples which differ by one clock period with respect to the luminance signal Y shown in FIG. 4(A) are at the rising edges of the chrominance signals.

Since sampling is not performed at the odd-numbered samples of the chrominance signals, the odd-number sample signals are colorless signals. Furthermore, as a result of the sampling deviation of the chrominance signals, only chrominance signals are displayed in a portion free of the luminance signals shown at the right side of FIGS. 4(A) and 4(B).

Figure 4C:
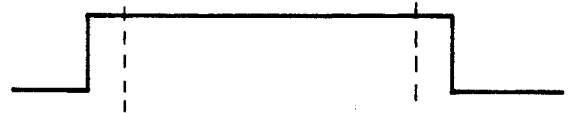

In this situation, the signal waveform shown in FIG. 4(C) indicates a temporally enlarged component luminance signal Y which has been enlarged in its input video area by sequential selection of the preceding component signal, reference component signal and trailing component signal produced by the delay circuit 13 shown in FIG. 1 and selected by the changeover switches 20 and 21 in response to the signal from edge detection circuit 22.

Figure 4D:
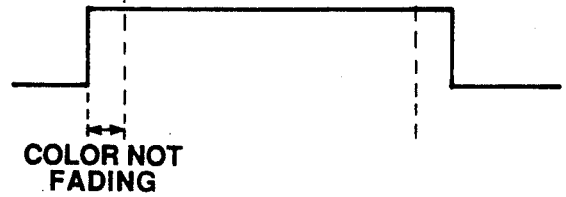

The signal waveform shown in FIG. 4(D) represents temporally enlarged component chrominance signals $C_R$ and $C_B$ produced by an operation similar to the case of the signal waveform shown in FIG. 4(C).

After this operation, there is no risk of color fading at a rising portion in the vicinity of the image synthesized with the background signal, or of fuzzy level display at the falling portion, so that smooth boundary display may be made by the use of the key signal.

From the foregoing it is seen that the present invention provides a special effect apparatus in which an input video signal is delayed to produce a reference video signal functioning as a temporal base, a preceding video signal temporally leading the reference signal and a trailing video signal to lagging the reference video signal, and in which portions of the preceding and trailing video signals are added before and after the reference video signal for temporally enlarging the edge portions of the reference video signal so as to reduce edge intrusion at the boundary between the temporally enlarged video signal and the background signal produced by the multiplication of the key signal and the background signal. On the other hand, color fading produced at the edge boundary between the input digital video signal and the background signal when signals with different sampling frequencies of the luminance and chrominance signals, such as the 4:2:2 digital video signals according to the so-called D1 format, may be eliminated.

Although the illustrative embodiment of the present invention has been described in detail herein with reference to the accompanying drawings, it is to be understood that the invention is not limited to this precise embodiment, and that various changes and modifications may be effected therein by one skilled in the art without departing from the scope or spirit of the invention as defined in the appended claims.

What is claimed is:

1. A special effect apparatus comprising:
means for receiving an input video signal,
means for receiving a key signal,
a signal delaying circuit for delaying said input video signal so as to produce a reference video signal, a preceding video signal temporally leading said reference video signal and a trailing video signal temporally lagging said reference video signal, and
changeover switch means responsive to said key signal for sequentially selecting a portion of said preceding video signal which temporally leads said reference video signal, followed by the entirety of said reference video signal, and concluding with a portion of said trailing video signal which temporally lags said reference video signal so as to produce a temporally enlarged video signal.

2. A special effect apparatus comprising:
means for receiving an input video signal in a digital component video signal format comprising a luminance signal and a chrominance signal each having a clock period,
means for receiving a key signal,
a signal delaying circuit including means for supplying said luminance signal as a preceding luminance signal, first delaying means for delaying said luminance signal by one clock period of the luminance signal so as to produce a reference luminance signal, second delaying means for delaying said reference luminance signal by one clock period of the luminance signal so as to produce a trailing luminance signal, means for supplying said chrominance signal as a preceding chrominance signal, third delaying means for delaying said chrominance signal by one clock period of the chrominance signal so as to produce a reference chrominance signal, and fourth delaying means for delaying said reference chrominance signal by one clock period of the chrominance signal so as to produce a trailing chrominance signal, and
changeover switch means responsive to said key signal for sequentially selecting portions of said preceding luminance signal and said preceding chrominance signal, respectively, which temporally lead said reference luminance signal and said reference chrominance signal, respectively, followed by the entirety of said reference luminance signal and said reference chrominance signal, respectively, and concluding with portions of said trailing luminance signal and said trailing chrominance signals, respectively, which temporally lag said reference luminance signal and said reference chrominance signal so as to produce a temporally enlarged luminance signal and a temporally enlarged chrominance signal which together comprise a temporally enlarged video signal in said digital component video signal format.

3. A special effect apparatus comprising:
means for receiving a composite video signal having a clock period.
means for receiving a key signal,
a signal delaying circuit including means for supplying said composite video signal as a preceding composite video signal, first delay means for delaying said composite video signal by one clock period of the input video signal so as to produce a reference composite video signal, and second delay means for delaying said reference composite video signal by one clock period so as to produce a trailing composite video signal, and
changeover switch means responsive to said key signal for sequentially selecting a portion of said preceding composite video signal which temporally leads said reference composite video signal, followed by the entirety of said reference composite video signal, and concluding with a portion of said trailing composite video signal which temporally lags said reference composite video signal so as to produce a temporally enlarged composite video signal.

4. A special effect apparatus comprising:
means for receiving an input video signal,
means for receiving a key signal,
edge detection means for detecting an edge of said key signal and generating an edge detection signal,
a signal delaying circuit for delaying said input video signal so as to produce a reference video signal, a preceding video signal temporally leading said reference video signal and a trailing video signal temporally lagging said reference video signal, and
changeover switch means responsive to said edge detection signal for sequentially selecting a portion of said preceding video signal which temporally leads said reference video signal, followed by the entirety of said reference video signal, and concluding with a portion of said trailing video signal which temporally lags said reference video signal so as to produce a temporally enlarged video signal.

* * * * *